(12) United States Patent
Zastrow et al.

(10) Patent No.: US 7,078,675 B2
(45) Date of Patent: Jul. 18, 2006

(54) VARIABLE HIGH SPEED SHUTTER FOR SPECTRORADIOMETRY

(75) Inventors: David M. Zastrow, Hacienda Heights, CA (US); Mark A. Kruer, Rolling Hills Estates, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 227 days.

(21) Appl. No.: 10/876,207

(22) Filed: Jun. 23, 2004

(65) Prior Publication Data

US 2005/0285028 A1 Dec. 29, 2005

(51) Int. Cl.
*H01J 3/14* (2006.01)
(52) U.S. Cl. ...................... 250/226; 250/216
(58) Field of Classification Search ............ 250/226, 250/216

See application file for complete search history.

(56) References Cited

U.S. PATENT DOCUMENTS 4,950,881 A * 8/1990 Kaltschmidt ............. 250/203.6

\* cited by examiner

*Primary Examiner*—Que T. Le
(74) *Attorney, Agent, or Firm*—Carmen B. Patti & Associates

(57) ABSTRACT

A radiation pulse, such as from a solar simulator, is spectrally analyzed over a selected sampling pulse that is shorter in duration than the radiation pulse and is timed to begin after the start of the radiation pulse. A deformable membrane mirror is controlled to function as a high speed shutter in the path of the radiation pulse. When not deformed, the mirror reflects the radiation pulse into an optical instrument, such as a spectroradiometer. A sampling pulse is generated for a selected time after the start of the radiation pulse and is applied to the mirror to ensure total reflection of the radiation pulse only for the duration of the sampling pulse. Controls are provided to adjust the start time and duration of the sampling pulse, and to adjust the sensitivity of sensing the start of the radiation pulse.

10 Claims, 2 Drawing Sheets

VARIABLE HIGH SPEED SHUTTER FOR SPECTRORADIOMETRY

BACKGROUND OF THE INVENTION

This invention relates generally to spectroradiometry and, more particularly, to techniques for selecting a desired sample of radiation for analysis in a spectroradiometer. In general, spectroradiometry is the spectral analysis of radiation received from a radiation source. Although spectroradiometry is used in a variety of applications, the present invention is principally concerned with spectroradiometry as applied in the spectral analysis of radiation emitted from a solar radiation simulator. Solar simulators are used to evaluate the performance of solar panels. Rather than exposing solar panels to sunlight, which may be impractical if the panels are to be deployed in space, a solar simulator is designed to generate a brief flash of radiation with a spectral content closely approximating that of the sun. Obviously, using a pulse of simulated radiation for this purpose requires less total energy that if a continuously operating simulator were used, and permits the use of components and conductors rated for much lower powers.

If a solar simulator is to be relied on in the testing of solar panels, the spectral content of the radiation generated by the solar simulator is of significant interest. In particular, what is of interest to solar panel designers is the spectral content of a solar simulator flash as recorded over a time interval that corresponds to the time interval of the flash used to evaluate solar panel performance. The spectral content of a flash of radiation from a solar simulator is known to vary with time as the energy of the flash builds to a plateau, and later decays. Unfortunately, a solar simulator typically provides no warning signal before it begins to produce a flash of output radiation, and yet spectral analysis of the flash must ideally be performed only over a narrow time interval at the same region of the flash of energy that is used in evaluating the solar panel or panels. Selection of this time interval using an electromechanical shutter to control the radiation has proved to be too slow. Typically, a simulated solar flash lasts for only approximately two milliseconds. The sample time of interest during the flash has to be determined with microsecond accuracy if useful spectral analysis is to be performed.

Accordingly, it would be desirable to be able to select with precision both a starting time and a time interval for analysis of the solar simulation flash, and to input the flash radiation to a spectroradiometry instrument only during this interval. The present invention satisfies this goal.

SUMMARY OF THE INVENTION

The present invention resides in apparatus and a related method for sampling a pulse of radiation. Briefly, and in general terms, the apparatus of the invention comprises an optical detector for sensing initiation of a pulse of radiation; timing electronics for producing a control pulse or a desired duration less than the duration of the pulse of radiation, and starting at a desired delay time after sensing of initiation of the pulse of radiation; and a mirror assembly comprising a deformable mirror that is aligned to receive the pulse of radiation, and that is responsive to the control pulse to assume a fully reflective state for the duration of the control pulse. The deformable mirror when in the fully reflective state reflects the pulse of radiation into a spectroradiometer for further processing. The deformable mirror when not in the fully reflective state prevents further processing or analysis of the pulse of radiation.

More specifically, the deformable mirror is an electrically actuated deformable membrane mirror, which is controllable to switch rapidly between a generally planar, undistorted state and a deformed state in which the mirror diffuses light impinging on it.

The timing electronics may comprise a first timer and a second timer. The first timer is triggered by a signal from the optical detector upon sensing initiation of the pulse of radiation, and the first timer generates an output signal when a selected delay time has elapsed after the initiation of the pulse of radiation. The second timer is triggered by the output signal from the first timer, and generates the control pulse applied to the mirror. Preferably, the first timer further comprises means for selecting the delay time; and the second timer further comprises means for selecting the duration of the control pulse.

The timing electronics may further comprise a comparator, for comparing the signal from the optical detector with a threshold level; and means for selecting the threshold level.

The invention may also be defined in terms of a method for sampling a pulse of radiation, comprising the steps of sensing the beginning of the pulse of radiation; triggering, in response to the sensing step, operation of a first timer, to measure a desired delay before sampling the pulse of radiation; and triggering a second timer in response to operation of the first timer, to generate a sampling pulse starting at a time determined by the first timer and having a duration determined by the second timer. The method further comprises applying the sampling pulse to control a deformable mirror and thereby switching the deformable mirror to a fully reflective state for the duration of the sampling pulse; and reflecting the pulse of radiation into a radiation measurement instrument when the deformable mirror is in the fully reflective state, to perform spectral analysis of the pulse of radiation during the time of the selected sampling pulse.

More specifically, the sensing step comprises generating an electrical signal from incident radiation received in the pulse of radiation; comparing the electrical signal with a threshold signal; and generating a triggering signal and applying it to the first timer when the electrical signal exceeds the threshold signal. The sensing step may further comprise varying the threshold signal to obtain a desired level of sensitivity to the beginning of the pulse of radiation. The method may further comprise adjusting the first timer to obtain a desired starting time for the sampling pulse; and adjusting the second timer to obtain a desired duration of the sampling pulse.

It will be appreciated from the foregoing summary, that the invention provides a significant advance in the field of spectroradiometry. In particular, the invention provides a rapidly responsive technique for sampling a radiation pulse, such as a pulse generated by a spectral simulator. The technique allows for selection of both the starting point and duration of the sampling period. Other aspects and advantages of the invention will become apparent from the following more detailed description, taken in conjunction with the accompanying drawings.

DETAILED DESCRIPTION OF THE INVENTION

Figure 1:
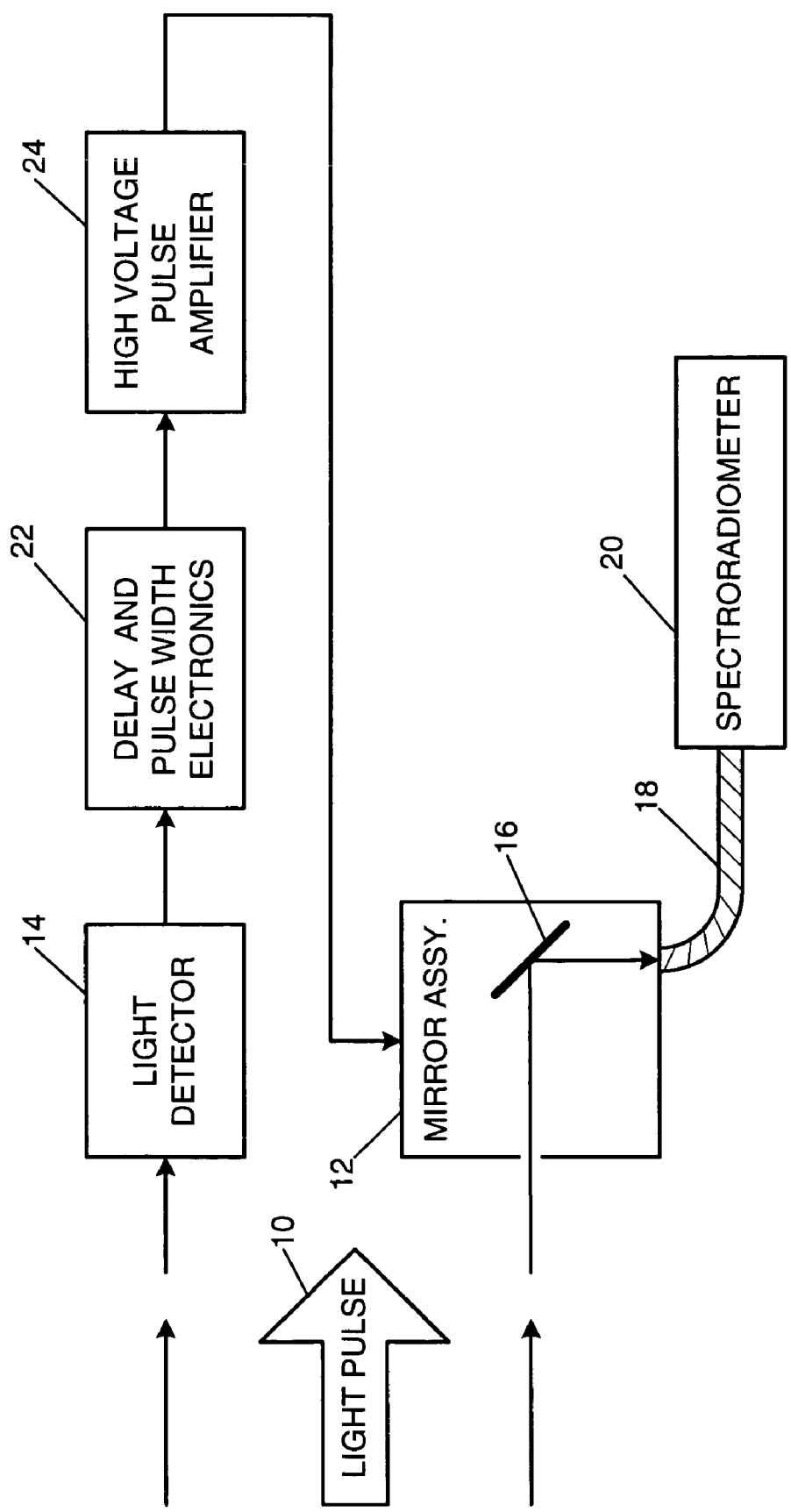
FIG. 1 is a schematic diagram of the apparatus of the present invention.

As shown in the drawings for purposes of illustration, the present invention pertains to a technique for sampling a flash or pulse of radiation and inputting the sampled radiation to a spectroradiometer for analysis. For some applications, a light pulse from a solar simulator must be spectrally analyzed over a precisely defined time interval. Failure to select the time interval correctly may result in the analysis of a different spectral sample, which would lead to errors when the solar simulator is used to evaluate components such as solar cells and panels.

In accordance with the present invention, light from a pulse of radiation is sampled using a high speed, electrically actuated shutter, which is switched to an open condition only during the desired time interval over which spectral analysis is to be performed. As shown in FIG. 1, a light pulse, indicated by reference numeral 10, is received at the apparatus of the invention, from a radiation source such as a solar simulator (not shown). The light pulse 10 impinges on a mirror assembly 12 configured as a high speed shutter, and on a light detector 14. When the mirror assembly 12 is in an 'on' condition, light falling on a mirror 16 that is part of the assembly 12 is reflected into a fiber optic bundle 18, for transmission to a spectroradiometer 20. When the mirror assembly is an 'off' condition, light from the pulse 10 is not reflected into the fiber bundle 18, and the spectroradiometer 20 derives practically no input from the light pulse 10.

The light detector 14 generates an output signal when light from the pulse 10 exceeds a selected and very low threshold level. This output signal is coupled to delay and pulse width electronics 22 and initiates a timing sequence. The electronics 22 includes two manually controllable timers. A first timer in the electronics 22 measures a delay time from near the beginning of the pulse to the beginning of a time interval over which spectral analysis will be performed. A second timer in the electronics 22 measures the width of a timing pulse that is generated by the electronics to control the time for which the mirror assembly 12 will remain in the open condition. The timing pulse generated in the electronics 22 is coupled to a high voltage pulse amplifier 24, which outputs control signals to the mirror assembly 12.

The mirror assembly 12 preferably includes a deformable membrane mirror (16) and the control signals received from the high voltage pulse amplifier 24 "open" the shutter formed by the mirror assembly by removing power from the mirror. In the open condition, the mirror 16 is substantially planar. Light from the pulse 10 is then reflected by the mirror 16 into the optical fiber bundle 18 and is input to the spectroradiometer 20. At the end of the desired sampling pulse, a high voltage control signal is supplied from the high voltage pulse amplifier 24 to the mirror assembly 12. The control signal is applied to the deformable mirror 16, distorting the mirror surface sufficiently to prevent light from the pulse 10 from being launched into the optical fiber bundle 18.

The mirror assembly 12 may be, for example, a membrane mirror light system (MMLS) available from Optron System, Inc., of Bedford, Mass. The MMLS mirror 16 is deformed in the 'off' condition by applying a voltage to its multiple electrodes. When the applied voltage is sufficiently high, the mirror 16 is deformed to include a two-dimensional array of dimples in its surface, which scatters the incident light to such a degree that practically no light is launched into the optical fiber bundle 18. When the applied voltage is removed, during the desired sampling interval, the mirror 16 reverts to its planar configuration and reflects light from the pulse 10 into the optical fiber bundle 18. Other optical components, such as lenses (not shown) may be employed, as needed, to launch the reflected light into the fiber bundle 18.

Figure 2:
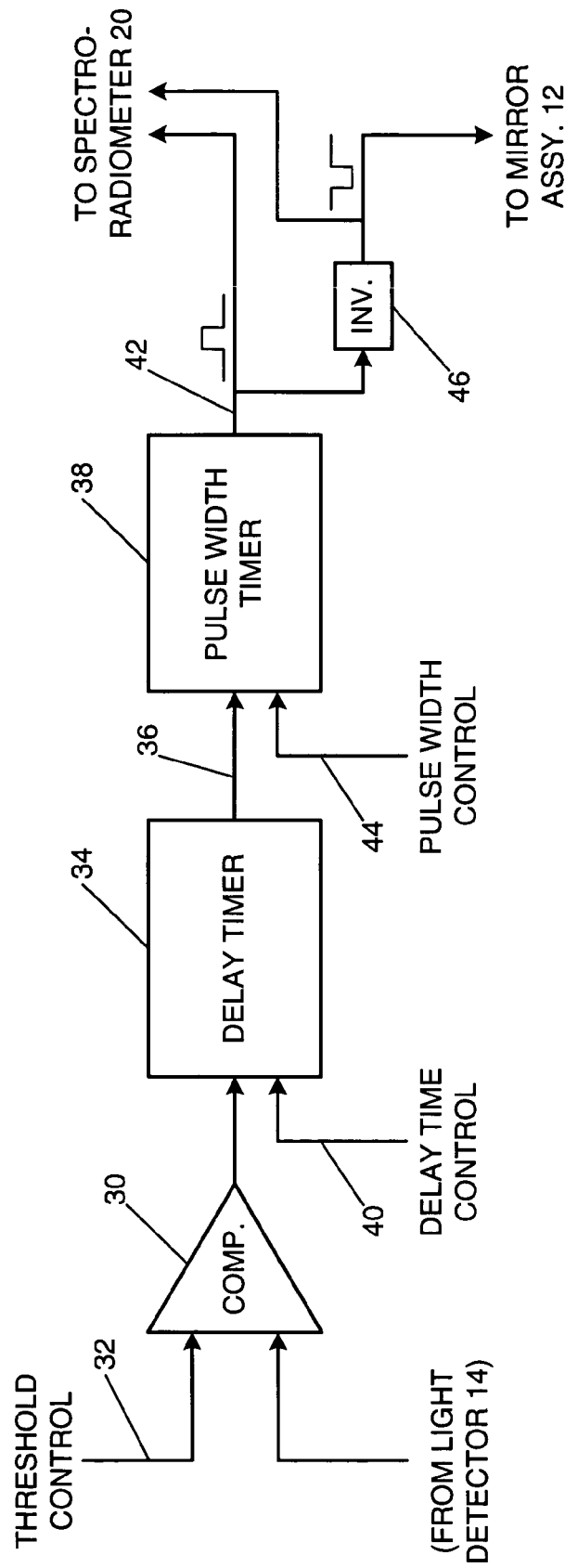
FIG. 2 is a simplified schematic diagram of pulse timing circuitry used in the invention.

The delay and pulse width electronics 22 may take any of a number of specific forms. FIG. 2 depicts the broad functions of the electronics 22. As indicated, an input signal from the light detector 14 is coupled to a comparator 30, the other input of which is a threshold level, on line 32, that can be changed by the user. Depending on the application of the invention, the threshold at which the circuitry is triggered to begin timing is user selectable by this input on line 32. The output of the comparator 30 is a trigger signal that is applied to a delay timer 34, which generates an output pulse on line 36, the trailing edge of which is used to trigger a second timer 38. The delay timer 34 is user controllable, as indicated by a control input on line 40, to trigger the second timer 38 at a selected time delay following the triggering of the first timer 34. The second timer 38 generates an output pulse on line 42, the pulse being controllable in width by another user control input on line 44. Thus, the first timer 34 determines the start time of the output pulse on line 42 and the second timer 38 determines the width of the output pulse on line 42. The output pulse on line 42 is inverted, as indicated by inverter 46, and coupled to the high voltage pulse amplifier 24 (FIG. 1) to control the mirror assembly 12. Inverted and non-inverted forms of the output pulse on line 42 may also be coupled to the spectroradiometer 20.

The delay timer 34 and pulse width timer 38 may be implemented in a variety of conventional ways. For example, a commonly used integrated circuit known by the standard designation NE556 provides a dual timer well suited for this purpose. Control of the delay time and the pulse width can be effected by use of variable resistors or variable capacitors in a resistor-capacitor (R-C) timing circuit associated with each of the timers. Similarly, control of the threshold sensitivity determined in the comparator 30 can be effected by a variable resistor or similar means. The high voltage pulse amplifier 24 may be of any suitable design. If the mirror assembly 12 is the MMLS manufactured by Optron System, Inc., a matching pulse amplifier designated PH-1 is available from the same manufacturer.

It will be appreciated from the foregoing that the present invention represents a significant advance in the field of spectroradiometry. In particular, the invention provides a more rapidly responsive shutter to allow spectral analysis of a pulse of radiation over a selected time interval shorter than the total duration of the pulse of radiation. It will also be appreciated that, although a specific embodiment of the invention has been illustrated and described by way of example, various modifications may be made without departing from the spirit and scope of the invention. Accordingly, the invention should not be limited except as by the appended claims.

The invention claimed is:

1. A variable speed shutter for use in spectroradiometry, comprising:
    an optical detector for sensing initiation of a pulse of radiation;
    timing electronics for producing a control pulse of a desired duration less than the duration of the pulse of radiation, and starting at a desired delay time after sensing of initiation of the pulse of radiation; and
    a mirror assembly comprising a deformable mirror that is aligned to receive the pulse of radiation, and that is responsive to the control pulse to assume a fully reflective state for the duration of the control pulse, wherein the deformable mirror in the fully reflective state reflects the pulse of radiation to allow its further processing, and wherein the deformable mirror not in the fully reflective state prevents further processing of the pulse of radiation.

2. A variable speed shutter as defined in claim 1, wherein the deformable mirror is an electrically actuated deformable membrane mirror.

3. A variable speed shutter as defined in claim 1, wherein the timing electronics comprise:
   a first timer, triggered by a signal from the optical detector upon sensing initiation of the pulse of radiation, wherein the first timer generates an output signal when a selected delay time has elapsed after the initiation of the pulse of radiation; and
   a second timer, triggered by the output signal from the first timer, for generating the control pulse.

4. A variable speed shutter as defined in claim 3, wherein:
   the first timer further comprises means for controlling the selected delay time; and
   the second timer further comprises means for controlling the duration of the control pulse.

5. A variable speed shutter as defined in claim 6, wherein the timing electronics further comprise:
   a comparator, for comparing the signal from the optical detector with a threshold level; and
   means for selecting the threshold level.

6. A method for sampling a pulse of radiation, comprising the steps of:
   sensing the beginning of the pulse of radiation;
   in response to the sensing step, triggering operation of a first timer, to measure a desired delay before sampling the pulse of radiation;
   in response to operation of the first timer, triggering a second timer, to generate a sampling pulse starting at a time determined by the first timer and having a duration determined by the second timer;
   applying the sampling pulse to control a deformable mirror and thereby switching the deformable mirror to a fully reflective state for the duration of the sampling pulse; and
   reflecting the pulse of radiation into a radiation measurement instrument when the deformable mirror is in the fully reflective state, to perform spectral analysis of the pulse of radiation during the time of the selected sampling pulse.

7. A method as defined in claim 6, wherein the sensing step comprises:
   generating an electrical signal from incident radiation received in the pulse of radiation;
   comparing the electrical signal with a threshold signal; and
   generating a triggering signal and applying it to the first timer when the electrical signal exceeds the threshold signal.

8. A method as defined in claim 7, wherein the sensing step further comprises varying the threshold signal to obtain a desired level of sensitivity to the beginning of the pulse of radiation.

9. A method as defined in claim 6, and further comprising:
   adjusting the first timer to obtain a desired starting time for the sampling pulse; and
   adjusting the second timer to obtain a desired duration of the sampling pulse.

10. A method as defined in claim 6, and further comprising:
    applying the sampling pulse to the radiation measurement instrument.

* * * * *